United States Patent [19]

Komuro

[11] Patent Number: 4,825,727
[45] Date of Patent: May 2, 1989

[54] SPEED REDUCER

[75] Inventor: Toshihiko Komuro, Tokyo, Japan

[73] Assignees: Canon Kabushiki Kaisha; Canon Seiki Kabushiki Kaisha, Tokyo, Japan

[21] Appl. No.: 191,830

[22] Filed: May 9, 1988

Related U.S. Application Data

[63] Continuation of Ser. No. 865,783, May 22, 1986, abandoned.

[30] Foreign Application Priority Data

| May 29, 1985 | [JP] | Japan | 60-80266[U] |
| May 29, 1985 | [JP] | Japan | 60-80267[U] |
| May 29, 1985 | [JP] | Japan | 60-80268[U] |
| May 29, 1985 | [JP] | Japan | 60-80269[U] |
| May 29, 1985 | [JP] | Japan | 60-80270[U] |

[51] Int. Cl.$^4$ .............. F16H 1/28; F16H 57/02; F16H 1/12
[52] U.S. Cl. .............. 74/801; 74/606 R; 74/421 R; 74/421 A
[58] Field of Search .............. 74/789, 801, 770, 606 R, 74/397, 396, 392, 421 R, 421 A

[56] References Cited

U.S. PATENT DOCUMENTS

| 983,950 | 2/1911 | Sundh | 74/770 |
|---|---|---|---|
| 1,059,450 | 4/1913 | Foote | 74/421 R |
| 1,111,884 | 9/1914 | Dentsch | 74/421 A |
| 1,481,345 | 1/1924 | Breeze | 74/421 A |
| 1,815,450 | 7/1931 | Schmal | 74/396 X |
| 2,252,967 | 8/1941 | Forton | 74/421 R X |
| 2,648,230 | 8/1953 | Stallsmith | 74/396 |
| 2,899,822 | 8/1959 | Matthews | 74/421 R X |
| 2,936,644 | 5/1960 | Miller | 74/606 R X |
| 2,950,628 | 8/1960 | Bade | 74/606 R X |
| 2,950,635 | 8/1960 | Bieger et al. | 74/606 R X |
| 3,263,521 | 8/1966 | Muller | 74/606 R |
| 3,333,482 | 8/1967 | Wildhaber | 74/421 A |
| 3,864,990 | 2/1975 | Lacoste | 74/666 R |
| 3,913,415 | 10/1975 | Herr | 74/740 X |
| 3,916,729 | 11/1975 | Herr | 74/740 X |
| 3,974,719 | 8/1976 | Tiliander | 74/789 X |
| 4,142,426 | 3/1979 | Baranyi | 74/801 |
| 4,502,353 | 3/1985 | Beaudoin | 74/789 X |
| 4,535,653 | 8/1985 | Coburn | 74/789 X |

FOREIGN PATENT DOCUMENTS 0221520  4/1985  Fed. Rep. of Germany .... 74/606 R
0678101  8/1952  United Kingdom .................. 74/770

Primary Examiner—Dirk Wright
Attorney, Agent, or Firm—Fitzpatrick, Cella, Harper & Scinto

[57] ABSTRACT

A speed reducer in which a shaft for supporting a plurality of pinion gears is provided on the closed end of a cylindrical gear mounting plate having one end closed, a reduction gear in meshing engagement with the pinion gear is contained in the cylindrical gear mounting plate, a single stage speed reducing unit is constituted by the gear mounting plate, the pinion gear and the reduction gear, and the gear mounting plates of the respective stages are closely joined together, and the cylindrical inner peripheral surface of the gear mounting plate is formed with ribs for intercepting sounds produced by the meshing engagement between the gears.

6 Claims, 6 Drawing Sheets

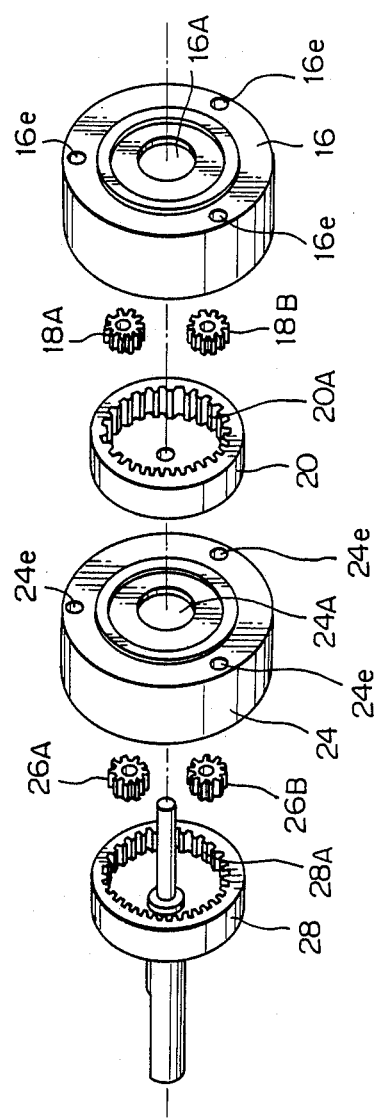
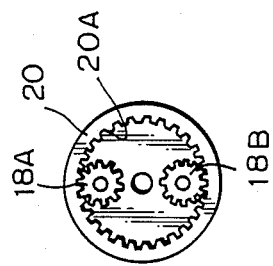
Fig. 3
Fig. 4

SPEED REDUCER

This application is a continuation of application Ser. No. 865,783 filed May 22, 1986, now abandoned.

BACKGROUND OF THE INVENTION

1. Field of the Invention

This invention relates to a speed reducer for decelerating the rotation of the rotary shaft of a motor and obtaining a desired speed.

2. An apparatus of the construction shown in FIG. 1 of the accompanying drawings is known as a speed reducer. The construction of FIG. 1 is such that a first spur gear 2 having a toothed portion 2A is fixed to the shaft 1 of a motor, a second spur gear 6 supported by a case 4 and having a toothed portion 6A is in meshing engagement with the first spur gear and an output shaft 8 is fixed to the second spur gear. In the case of the above-described construction according to the prior art, the axis $O_1$ of the shaft of the motor and the axis $O_2$ of the reduction output shaft are not coincident with each other, but have an amount of deviation therebetween and therefore, it has been difficult to transmit the revolution of the motor to the output shaft 8 without causing eccentricity and run-out. Further, in the above-described construction, the outer diameters of the spur gears which perform the speed reducing action are great and it has been difficult to incorporate such apparatus into instruments which are required to be compact.

That is, in the conventional apparatus of FIG. 1, the distance between the shaft 1 of the motor and the axis of the output shaft 8 is determined by the mounted position of a motor case (not shown) and the speed reducing case 4 and the mounted position of the unshown bearing of the output shaft 8, and adjustment of these mounted positions is accomplished as by adjustment of mounting holes and mounting screws, and attainment of accurate mounted positions has been difficult. Furthermore, because of the tolerance of the finish dimensions of parts, there has been more or less irregularity in the individual speed reducers. Therefore, when the revolution of the motor is to be transmittted to the drive shaft of an FA (factory automation) instrument, not shown, through the speed reducer, it has been difficult for the revolution of the motor to be smoothly transmitted to the drive shaft, and this has also seriously affected the performance of the FA instrument.

Further, in the conventional speed reducer, where reduction gears are constructed in multistage to increase the reduction gear ratio, fastening means such as screws or caulking has been resorted to for the arrangement and coupling of the speed reducing units, and this has led to errors in the assembled position, which in turn has resulted in the lack of smoothness of the rotation transmitting portion. Also, if the number of stages of engagement between gears is increased to increase the reduction gear ratio, there are produced great sounds by the meshing engagement and rotation of the gears and thus, the conventional speed reducer has suffered from an undesirable problem as a speed reducer to be incorporated into a business machine.

SUMMARY OF THE INVENTION

It is an object of the present invention to overcome the above-noted disadvantages and to provide a speed reducer in which the shaft of a motor and an output shaft are made coincident with each other, whereby the diametrical dimension of the apparatus can be reduced.

It is another object of the present invention to provide a speed reducer in which the torque of the output shaft can be amplified as desired.

It is still another object of the present invention to provide a speed reducer in which even if the number of speed reduction stages is made multiple and the number of meshing portions of gears is increased, the production of meshing and rotation sounds is minimized.

It is yet still another object of the present invention to make the speed reducing portions into units and thereby eliminate the necessity of taking the trouble of coupling the speed reducing units even if the number of couplings of such units is increased.

Other objects of the present invention will become apparent from the following detailed description of an embodiment thereof taken in conjunction with the accompanying drawings.

BRIEF DESCRIPTION OF THE DRAWINGS

FIG. 3 is a developed view of a first stage speed reducing unit and a second stage speed reducing unit as seen from a direction opposite to FIG. 2.

FIG. 4 shows the meshing engagement between the internal teeth 20A of a reduction gear 20 and pinion gears 18A and 18B.

DESCRIPTION OF THE PREFERRED EMBODIMENT

An embodiment of the present invention will hereinafter be described with reference to the drawings.

Figure 1:
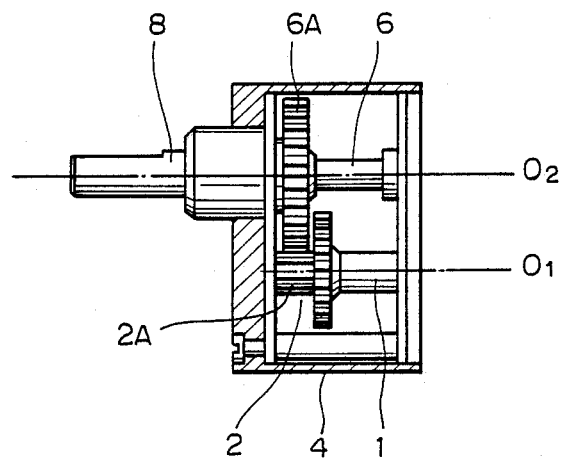
FIG. 1 is a cross-sectional view of a speed reducer according to the prior art.
Figure 2:
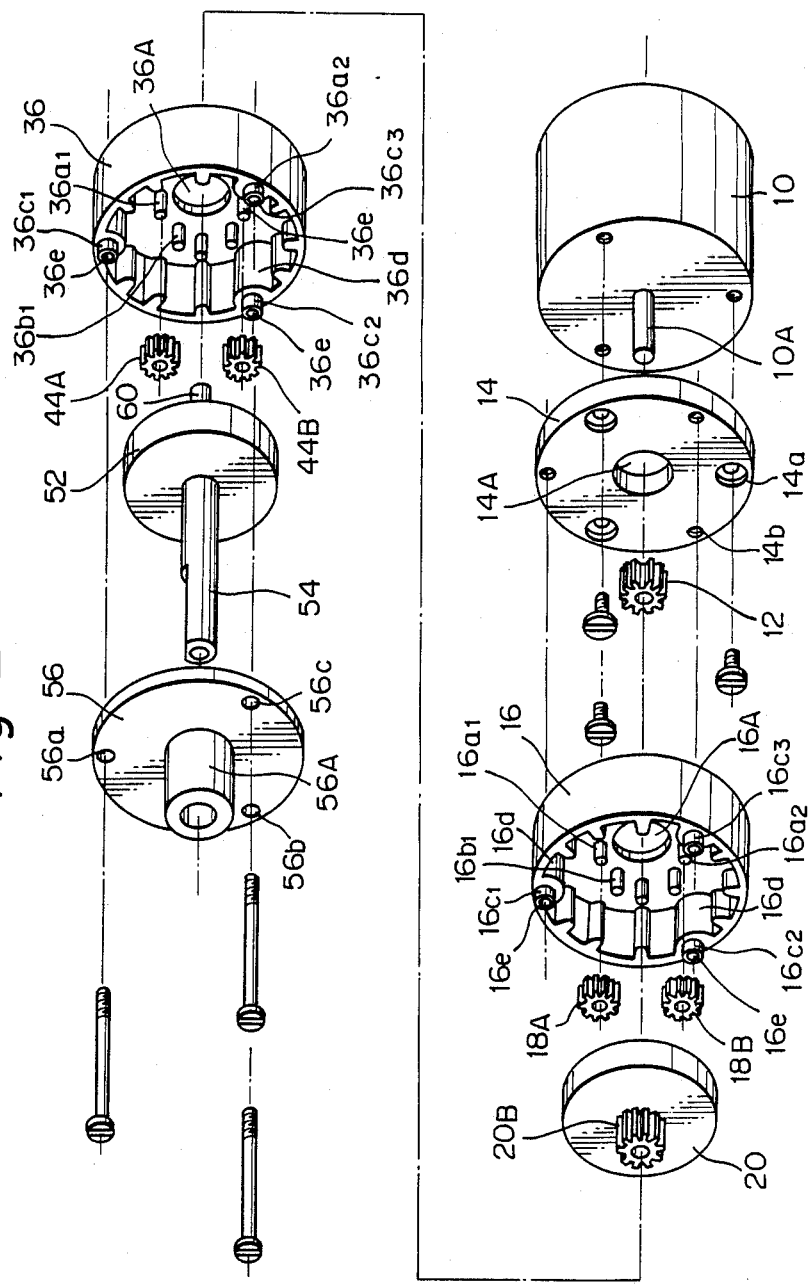
FIG. 2 is a developed view of the essential portions of a speed reducer according to an embodiment of the present invention.

Referring to FIG. 2 which is an exploded view of the essential portions of a speed reducer, reference numeral 10 designates a motor and reference character 10A denotes the rotary shaft of the motor. Reference numeral 12 designates a pinion gear fixed to the motor shaft 10A. Reference numeral 14 denotes a seat plate attached to the motor 10. The seat plate 14 is a plate for mounting on the motor 10 a speed reducer B which will be described later. The seat plate 14 is provided with several types of threaded holes 14a, 14b, . . . at a distance from the center position of the central through-hole 14A thereof so as to enable a speed reducer which will be described later to be mounted on different types of motors. Reference numeral 16 designates a first gear mounting plate in the form of a ring having a central through-hole 16A and pins $16a_1$, $16a_2$, $16b_1$, $16b_2$, . . . . The pins $16a_1$ and $16a_2$ of the first gear mounting plate 16 are provided at 180° opposite positions equidistant from the center of the through-hole 16A, and the other pins $16b_1$ and $16b_2$ are provided at 180° opposite positions in a different diametrical direction from the pins $16a_1$ and $16a_2$. These pins are for changing the mounted positions of intermediate gears to be described in conformity with the combination of the intermediate gears and reduction gears. Reference characters $16c_1$, $16c_2$ and $16c_3$ denote bosses projected on the thick-walled portion $16d$ of the outer shell of the gear mounting plate 16 in a direction parallel to the axis thereof. Each of these bosses and the thick-walled portion $16d$ are formed with a through-hole $16e$.

Reference characters 18A and 18B designate intermediate gears supported on the pins $16a_1$, $16a_2$, $16b_1$, $16b_2$, ... of the first gear mounting plate and rotatable about said pins. Reference numeral 20 denotes a first reduction gear which is a gear having an internal gear portion 20A in meshing engagement with the intermediate gears 18A and 18B and a spur gear portion 20B, as shown in FIGS. 3 and 4, said two gear portions being formed integrally with each other.

The pinion gear 12, the intermediate gears 18A, 18B, the first gear mounting plate 16 and the first reduction gear 20 together constitute a first stage speed reducing unit. Reference numeral 24 designates a second gear mounting plate which, like the first gear mounting plate 16, has pins $24a_1$ and $24a_2$, a through-hole 24A into which is inserted the spur gear portion 20B of the first reduction gear 20, bosses $24c_1$, $24c_2$ and $24c_3$, thick-walled portions $24d$, and a through-hole $24e$. Reference characters 26A and 26B denote second intermediate gears supported on the pins $24a_1$ and $24a_2$, respectively, of the second gear mounting plate.

Reference numeral 28 designates a second reduction gear in meshing engagement with the second intermediate gears 26A and 26B and having an internal gear portion 28A and a spur gear portion 28B. The second gear mounting plate 24, the intermediate gears 26A, 26B and the second reduction gear 28 together constitute a second stage speed reducing unit.

Third, fourth, ..., sixth gear mounting plates 30, 32, 34, 36, intermediate gears 38A, 38B, 40A, 40B, 42A, 42B, 44A, 44B, and third stage, ..., sixth stage reduction gears 46, 48, 50, 52 are combined together in succession. The toothed portion of the sixth stage reduction gear 52 has an internal gear 52A and does not have a spur gear portion. Reference numeral 54 denotes a hollow output shaft which is caulking-coupled to the sixth stage reduction gear 52. Reference numeral 56 designates a case, and a sleeve bearing 56A is caulking-coupled to a disc-like case.

Reference numeral 60 denotes a center pin for making the axes of the output shaft 54 and the reduction gears 20, 28, 46, 48, 50 coincident with one another. The center pin 60 is fitted to the central through-hole of each reduction gear and the center point 54A of the hollow shaft.

The first gear mounting plate 16, the first reduction gear 20 and the intermediate gears 18A, 18B together constitute a first stage speed reducing unit, and the respective subsequent gear mounting plates, reduction gears and intermediate gears together constitute respective stage speed reducing units.

In the speed reducer of the above-described construction, when the motor shaft 10A rotates, the first stage reduction gear ratio is the gear ratio of the pinion gear 12 and the internal teeth 20A of the first reduction gear 20, the second stage reduction gear ratio is the ratio of the number of teeth of the spur gear portion 20B of the first reduction gear 20 to the number of internal teeth 28A of the second reduction gear 28, and each of the subsequent stage reduction gear ratios is the ratio of the number of teeth of the spur gear of the preceding stage reduction gear to the number of internal teeth of the succeeding stage reduction gear. The reduction gear ratio of the output shaft 54 of the speed reducer B is the product of the reduction gear ratios of the respective stages.

The rotation of the motor shaft is transmitted to the intermediate gears 18A and 18B through the pinion gear 10A. The intermediate gears 18A and 18B are rotated about the pins $16a_1$ and $16a_2$, respectively, of the first gear mounting plate 16, and the rotation thereof is transmitted to the first reduction gear 20.

In the construction of the present embodiment, when the rotation is transmitted to each of the subsequent stage reduction gears through the intermediate gears supported on the pins of the gear mounting plate, the intermediate gears do not change their centers of rotation but are rotated at predetermined positions and therefore, transmission of the rotation can be changed and accomplished.

The respective stage speed reducing units are serially arranged on the axis $X_1$-$X_2$ of the output shaft 10A of the motor.

Figure 5:
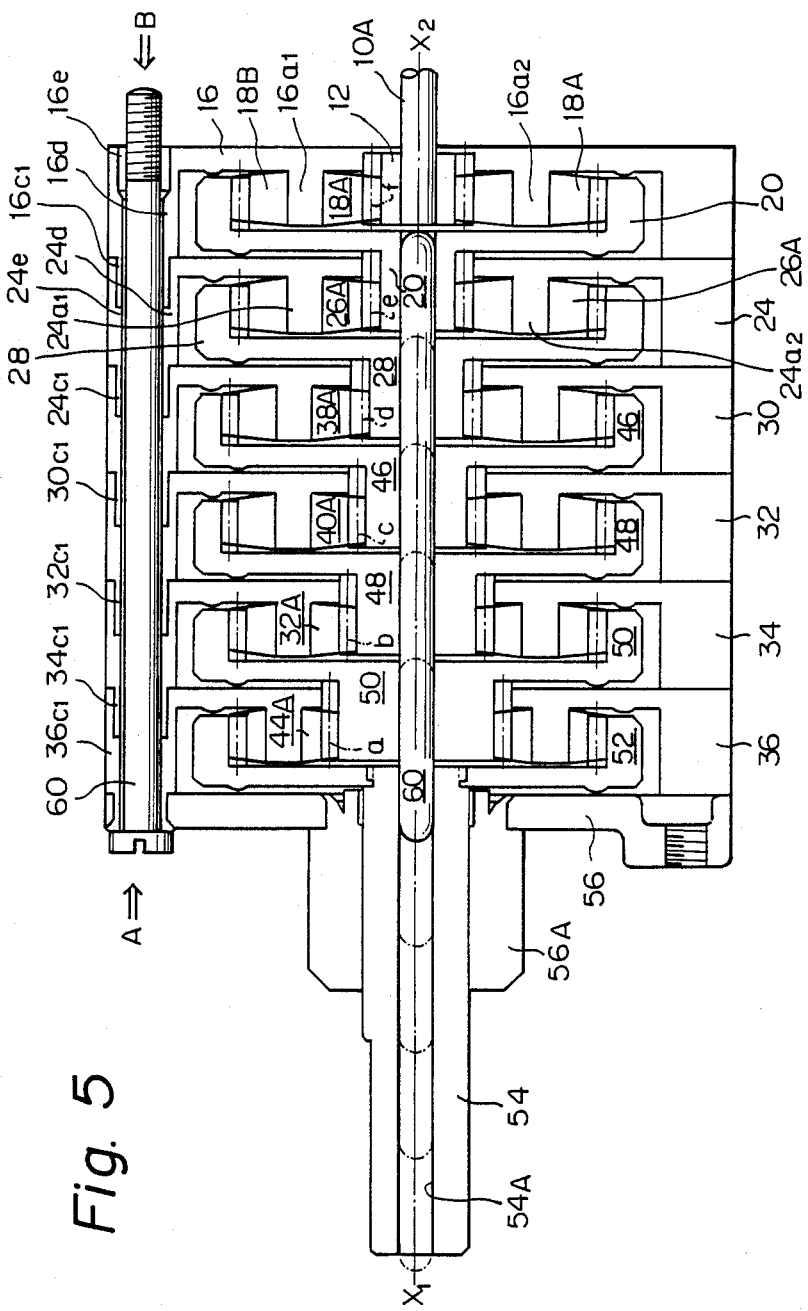
FIG. 5 is an axial cross-sectional view of the speed reducer.
Figure 6A:
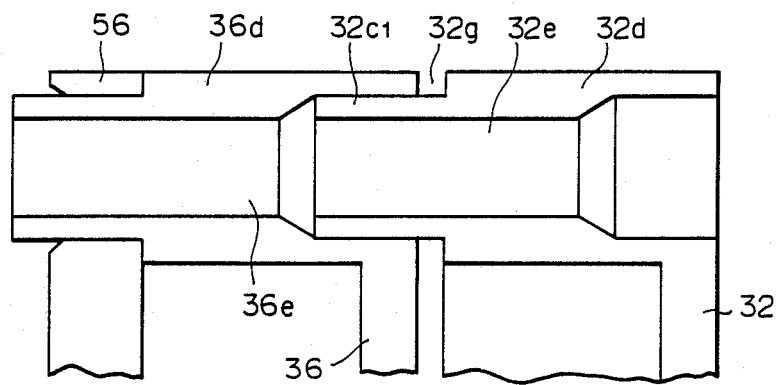
FIGS. 6A and 6B illustrate the ultrasonic welding of gear mounting plates.
Figure 6B:
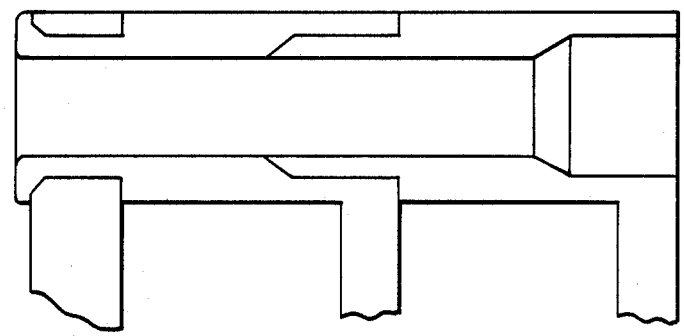

Coupling of the respective stage speed reducing units is accomplished by ultrasonic welding. FIGS. 6A and 6B illustrate the ultrasonic welding. In FIG. 6A, a boss $32c_1$ provided on one end of the thick-walled portion $32d$ of the outer shell of the fifth gear mounting plate 32 is engaged with an engagement hole $36e$ provided in the end surface opposite to the boss $36c_1$ of the outer shell of the sixth gear mounting plate 36. The length of the boss $32c_1$ before welded has a welding allowance $32g$ relative to the depth of the engagement hole $36e$. The bosses of the respective gear mounting plates are brought into engagement with the engagement hole and ultrasonic wave is applied in the directions of arrows A and B indicated in FIG. 5 and the bosses are pressed, whereby the tip end of each boss is welded to the seat surface of the engagement hole, as indicated by dotted line in FIG. 5.

By this pressing and welding operation, the welding allowance of the boss is eliminated and the gear mounting plates are closely welded together.

The case 56 and the sixth gear mounting plate 36 are caulking-coupled together by inserting the bosses $36c_1$, $36c_2$ and $36c_3$ of the gear mounting plate 36 into holes $56a$, $56b$ and $56c$, respectively, formed in the outer periphery of the case 56.

Where the number of teeth of each intermediate gear and the number of internal teeth of each reduction gear and the number of teeth of the spur gear portion of each reduction gear are constant in the abovedescribed construction, the distance between each reference pitch circle a, b, c, d, ..., e of the meshing portion of each toothed portion and the axis $O_1$-$O_2$ of the output shaft is constant. Where the numbers of teeth of the toothed portions of the intermediate gears and the reduction gears are made to differ from one another in order to make the reduction gear ratio great, the gear diameters of the intermediate gears also differ from one another. Therefore, pins $16b_1$ and $16b_2$ or $16c_1$ and $16c_2$ discrete and different in mounted position from the pins $16a_1$ and $16a_2$ on which the intermediate gears are supported are provided on the gear mounting plate. By so providing a plurality of pins different in mounted position on the gear mounting plate, there can be provided a construction corresponding to the change of the reduction gear ratio.

In the present embodiment, each of said gear mounting plates, the intermediate gears and the reduction gears may be formed of a resin material such as polyacetal resin to thereby reduce the weights of these members and reduce the noise during rotation.

Figures 7A, 7B:
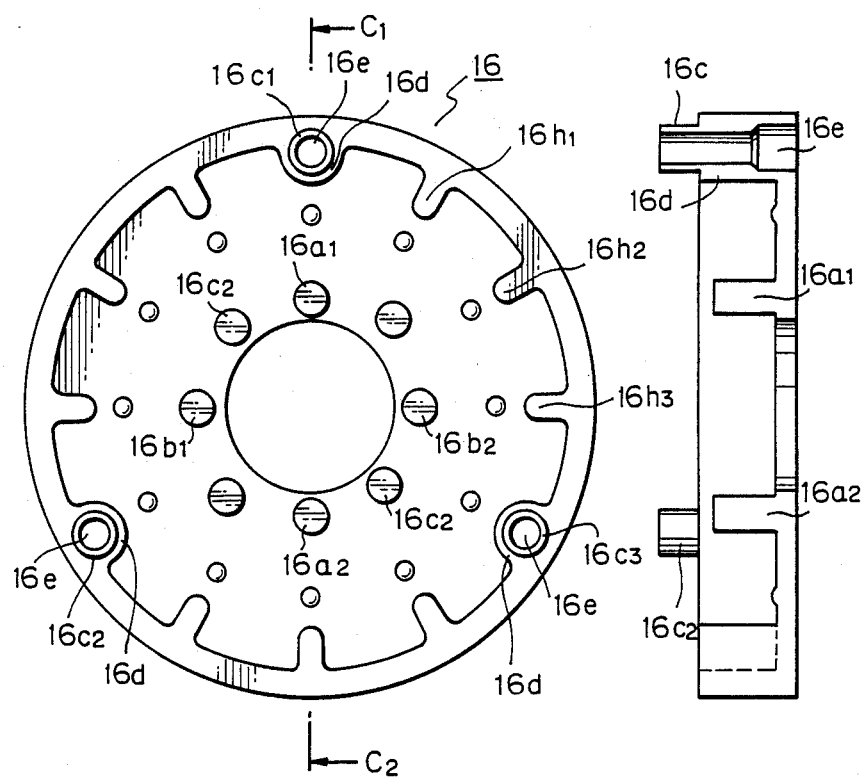
FIG. 7A is a plan view of a gear mounting plate.
FIG. 7B is a cross-sectional view of the gear mounting plate taken along line $c_1$–$c_2$ of FIG. 7A.

The sound insulation of the speed reducer of the construction as shown in FIGS. 2 to 6 will now be described with reference to FIGS. 7A and 7B.

The gear mounting plates 16, 24, ..., 36 each form a cylindrical shape having one end closed, and vertical projections or ribs $16h_1$, $16h_2$, ..., $16h_n$ extending toward the axis $X_1$-$X_2$ are provided on the inner wall surface of the cylinder. Pinions 18A and 18B supported on pins $16a_1$ and $16a_2$, respectively, are in meshing engagement with the internal teeth of the reduction gear and are further in meshing engagement with the toothed portion of the reduction gear and are thus rotated. The meshing portion of each gear is contained in the cylinder of the gear mounting plate and the open side of the gear mounting plate is closely joined to the next stage gear mounting plate and therefore, the mesh engagement of each gear is confined in a hermetically sealed chamber and the sound produced by the rotation of the meshing portions is reflected by the ribs $16h_1$, ..., $16h_n$ and thus, the volume of sound transmitted along the outer shell of the gear mounting plate and leaking outwardly is greatly reduced.

As described above, according to the present invention, the rotary shaft of the motor can be made coincident with the axis of the output shaft of the speed reducer by a combination of the gear mounting plates, the intermediate gears and the reduction gears, whereby a driving output can be obtained, and this leads to the possibility of providing a speed reducer which is free of the rotational vibration, irregularity and run-out of the output shaft.

Further, according to the present invention, any free reduction gear ratio can be obtained by providing a plurality of combinations of several sets (stages) of the gear mounting plates, the intermediate gears and the reduction gears and even if a set of these members is serially combined, the diametrical dimension of the entire speed reducer does not become great, and this is very convenient for the speed reducer to be incorporated into an FA instrument or a business instrument in which various units are crowded.

Especially, according to the present invention, the gear mounting plates of the respective stage speed reducing units are made by synthetic resin molding and their bosses are engaged with and ultrasonically welded to the engagement holes and thus, the respective stage gear mounting plates are integrally coupled together, and as compared with the conventional coupling means using screws, adhesion or the like, this eliminates the misalignment and positional deviation during the coupling of the gear mounting plates and prevents the fastening portions from being loosened by aging and thus, the quality and assured accuracy of the product can be enhanced.

Particularly, according to the present invention, the gear mounting plates are closely coupled together and the ribs for reflecting the sounds produced from the peripheral surfaces of the gear mounting plates by rotational meshing engagement therebetween are formed, whereby the transmission of the rotational sounds to the outside can be greatly reduced.

What is claimed is:

1. A speed reducer comprising:
   a pinion gear fixed to a drive shaft;
   a plurality of speed reduction units arranged from first to last, of which said first reduction unit comprises:
   a cylindrical gear mounting member having first and second ends, said first end being open and said second end being closed, said cylindrical gear mounting member forming a fixed outer cylindrical portion of said speed reducer and being provided with a central hole into which said pinion gear is inserted in said second end, said cylindrical gear mounting member supporting thereon a plurality of intermediate gears and said pinion gear being positioned within said cylindrical gear mounting member;
   a reduction gear having an internal gear portion which engages said intermediate gears, said internal gear being positioned in said cylindrical gear mounting member, said reduction gear having an output shaft with an axis coincident with said drive shaft, and said reduction gear being integrally formed with said internal gear portion and said output shaft; and
   means for positioning a plurality of said intermediate gears and said reduction gear, which is selected with respect to a number of gear teeth to provide a desired reduction ratio, being provided on said cylindrical gear mounting member; and further comprising:
   connecting means for connecting said plurality of speed reduction units in a close proximity, said connecting means having coupling portions provided on said first and second ends of said cylindrical gear mounting member; and
   spur gear means for transmitting a drive force between said speed reduction units, said spur gear means being provided on said output shaft of said reduction gear to mesh with said intermediate gears of a succeeding cylindrical gear mounting member through a central hole of a succeeding unit, wherein succeeding speed reduction units have identical elements with said first speed reduction unit and intermediate gears of said succeeding speed reduction units mesh with said spur gear means of a preceding speed reduction unit.

2. A speed reducer according to claim 1, wherein said positioning means is provided with two or more sets of shafts for adjusting the position of said plurality of intermediate gears.

3. A speed reducer according to claim 1 wherein said gear mounting plate has its cylindrical inner peripheral surface formed with ribs for intercepting sounds produced by the meshing engagement between the gears.

4. A speed reducer according to claim 1, wherein a reduction gear of said final speed reduction unit is formed with an output shaft separate from said reduction gear.

5. A speed reducer according to claim 1, wherein said output shaft is integrally formed with said spur gear means.

6. A speed reducer comprising:
   a plurality of speed reduction units, each speed reduction unit having:
   a cylindrical gear mounting member having first and second ends, said first end being open and said second end being closed, said cylindrical gear mounting member forming a fixed outer cylindrical portion of said speed reducer and being provided with a central hole in said second end, said cylindrical gear mounting member supporting thereon a plurality of intermediate gears being positioned within said cylindrical gear mounting member;

a reduction gear having an internal gear portion which engages said intermediate gears, said internal gear being positioned in said cylindrical gear mounting member, said reduction gear having an output shaft and said reduction gear being integrally formed with said internal gear and said output shaft; and means for positioning a plurality of said intermediate gears and said reduction gear, which is selected with respect to a number of gear teeth to provide a desired reduction ratio, being provided a desired reduction ratio, being provided on said cylindrical gear mounting member; and further comprising:

connecting means for connecting adjacent and separate speed reduction units in a close proximity, said connecting means having coupling portions provided on said first and second ends of said cylindrical gear mounting member; and spur gear means for transmitting a drive force between said speed reduction units, said spur gear means being provided on said output shaft of said reduction gear to mesh with said intermediate gears of a succeeding cylindrical gear mounting member through a central hole of a succeeding unit, wherein said intermediate gears of a first said speed reduction units are adapted to be engageable through said central hole thereof with a pinion gear fixed to a driving source so as to comprise an input portion of said speed reducer, and said reduction gear of a final speed reduction unit having an output shaft separate from said reduction gear so as to comprise an output portion of said speed reducer.

* * * * *

UNITED STATES PATENT AND TRADEMARK OFFICE
CERTIFICATE OF CORRECTION

PATENT NO. : 4,825,727

DATED : May 2, 1989

INVENTOR(S) : Toshihiko Komuro

It is certified that error appears in the above-identified patent and that said Letters Patent is hereby corrected as shown below:

[56]  References Cited:

Line 3, "Dentsch" should read --Deutsch--.

COLUMN 1:

Line 12, "2. An" should read

--2.  Related Background Art

An--.

COLUMN 4:

Line 50, "abovedescribed" should read --above-described--.

COLUMN 6:

Line 49, "claim 1" should read --claim 1,--.

COLUMN 7:

Line 14, delete "a desired".

Line 15, delete "reduction ratio, being provided".

UNITED STATES PATENT AND TRADEMARK OFFICE
CERTIFICATE OF CORRECTION

PATENT NO. : 4,825,727

DATED : May 2, 1989

INVENTOR(S) : Toshihiko Komuro

It is certified that error appears in the above-identified patent and that said Letters Patent is hereby corrected as shown below:

<u>Column 8:</u>

Line 11, "units" should read --unit--.

Signed and Sealed this

Twenty-fifth Day of September, 1990

*Attest:*

HARRY F. MANBECK, JR.

*Attesting Officer*  *Commissioner of Patents and Trademarks*